United States Patent
Zhang et al.

(10) Patent No.: US 7,849,318 B2
(45) Date of Patent: Dec. 7, 2010

(54) METHOD FOR SESSION SECURITY

(75) Inventors: Kai Zhang, Sunnyvale, CA (US);
Linlong Jiang, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 835 days.

(21) Appl. No.: 11/765,360

(22) Filed: Jun. 19, 2007

(65) Prior Publication Data

US 2008/0320307 A1    Dec. 25, 2008

(51) Int. Cl.
*H04L 9/32* (2006.01)
*H04L 29/06* (2006.01)
*H04K 1/00* (2006.01)
*H04L 9/00* (2006.01)
*H04L 9/28* (2006.01)

(52) U.S. Cl. .......... 713/176; 713/155; 713/170; 713/181; 713/182; 380/28; 380/30

(58) Field of Classification Search .......... None
See application file for complete search history.

(56) References Cited

U.S. PATENT DOCUMENTS

| | | | |
|---|---|---|---|
| RE37,178 E * | 5/2001 | Kingdon | 713/170 |
| 6,751,733 B1 * | 6/2004 | Nakamura et al. | 713/182 |
| 7,039,713 B1 * | 5/2006 | Van Gunter et al. | 709/229 |
| 2002/0026583 A1 * | 2/2002 | Harrison et al. | 713/172 |
| 2004/0052377 A1 * | 3/2004 | Mattox et al. | 380/277 |
| 2006/0059201 A1 * | 3/2006 | Watanabe | 707/104.1 |
| 2006/0117175 A1 * | 6/2006 | Miura et al. | 713/155 |
| 2006/0174323 A1 * | 8/2006 | Brown et al. | 726/3 |
| 2008/0091821 A1 * | 4/2008 | Dick et al. | 709/224 |
| 2009/0254756 A1 * | 10/2009 | Kawakita | 713/181 |

* cited by examiner

*Primary Examiner*—Shin-Hon Chen
(74) *Attorney, Agent, or Firm*—Martine Penilla & Gencarella, LLP

(57) ABSTRACT

A secret string is established so as to be known only to a client computing system and a server computing system. A non-encrypted version of a message, a message counter value, and first hash value are received by the server computing system from the client computing system. The first hash value, based on a content of the message, the message counter value, and the secret string, is generated at the client computing system using a first hash algorithm. Using the first hash algorithm, the server generates second hash value based on the content of the received message, the received message counter value, and the secret string. The server computing system accepts the received non-encrypted version of the message as authentic upon determining that the received message counter value is greater than a previously received message counter value and that the second hash value matches the first hash value.

18 Claims, 3 Drawing Sheets

METHOD FOR SESSION SECURITY

BACKGROUND OF THE INVENTION

Many internet applications need to maintain accurate communication session states on the server side for better security and performance. However, communication sessions are vulnerable to hijacking because messages are commonly transmitted over the unsecured internet. For example, a hacker could trap a message, modify it, replace it with its own, or replay the same message multiple times. Existing solutions for protecting the integrity of a communication session rely upon encrypting an entire message, transmitting the encrypted message over the internet, and decrypting the message at the destination. For example, HTTPS (hypertext transfer protocol secured) and SSH (secure shell) use such a technique.

While full-message-encryption prevents messages from being observed, full-message-encryption is quite costly. Moreover, the problem of secure communication is compounded because for security and performance reasons many internet servers do not support persistent connections such as HTTPS keep-alive. Therefore, each message has to be transmitted over a new connection, whose establishment goes through the entire process of the HTTPS handshake protocol. The HTTPS handshake protocol involves a private key decryption operation which is known to be more expensive than symmetric message encryption/decryption.

For applications that need to protect the message content from being observed, the above-mentioned full-message-encryption process is likely a necessary expense. However, many applications do not mind that the message content is observed so long as the message content is not altered or used malevolently. For example, stock quotes and news reports are intended to be viewed publicly but need to be reliable. Therefore, while full-message-encryption for publicly viewable messages will ensure message content integrity, it will waste resources on preventing the public viewing of the messages. Consequently, in a server-client communication process, a solution is desired for ensuring the integrity of a publicly viewable message during transmission without wasting resources on preventing the public viewing of the message during transmission.

SUMMARY OF THE INVENTION

In one embodiment, a method is disclosed for securing communication between client and server computing systems. The method includes an operation for receiving at the server computing system an encrypted version of a secret string. The secret string is generated at the client computing system. Also, the secret string is encrypted at the client computing system using a public key associated with a private key of the server computing system. The method also includes an operation for decrypting the encrypted secret string at the server computing system using the private key of the server computing system. The method further includes an operation for using the secret string to authenticate a message received at the server computing system as having been transmitted from the client computing system and received at the server computing system in an unaltered state.

In another embodiment, a method is disclosed for operating a server computing system to conduct secure communication with a client computing system. The method includes an operation for establishing a secret string that is known only to the server and client computing systems. The method also includes an operation for receiving from the client computing system at the server computing system each of a non-encrypted version of a message, a message counter value, and a first hash value. The first hash value is generated based on a content of the message, the message counter value, and the secret string using a first hash algorithm. The method further includes an operation for generating a second hash value at the server computing system using the first hash algorithm. The second hash value is based on the content of the received message, the received message counter value, and the secret string. Upon determining at the server computing system that the received message counter value is greater than a previously received message counter value and that the second hash value matches the first hash value, an operation is performed to accept the non-encrypted version of the message received at the server computing system as authentic.

In another embodiment, a computer readable medium including program instructions for operating a server computing system to conduct secure communication with a client computing system is disclosed. The computer readable medium includes program instructions for operating the server computing system to receive an encrypted version of a secret string from the client computing system. The secret string is generated at the client computing system and is encrypted at the client computing system using a public key associated with a private key of the server computing system. The computer readable medium also includes program instructions for operating the server computing system to decrypt the encrypted secret string using the private key of the server computing system. The computer readable medium further includes program instructions for operating the server computing system to use the secret string to authenticate messages received from the client computing system.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
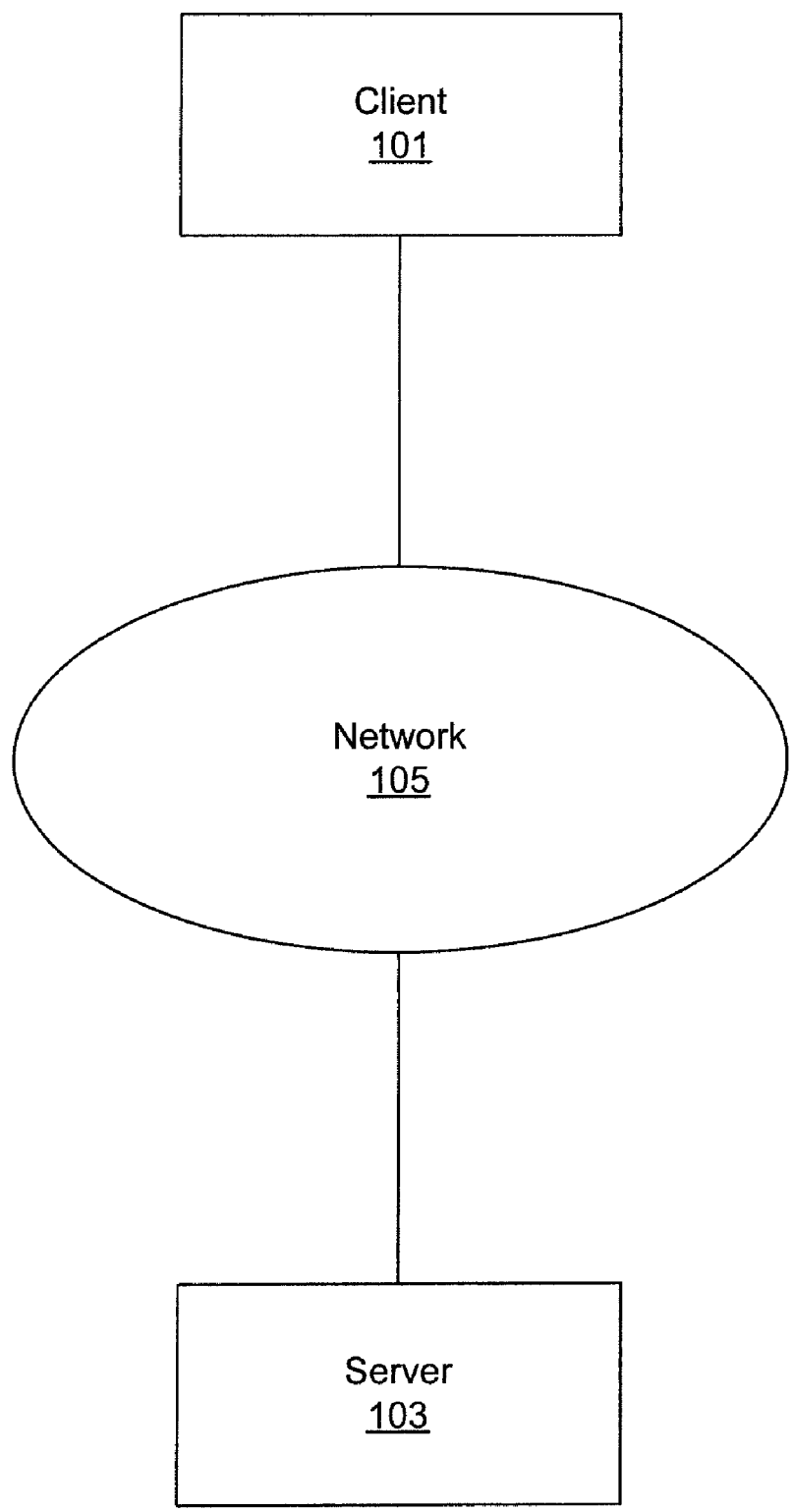
FIG. 1 is an illustration showing a communication architecture, in accordance with one embodiment of the present invention.
Figure 2:
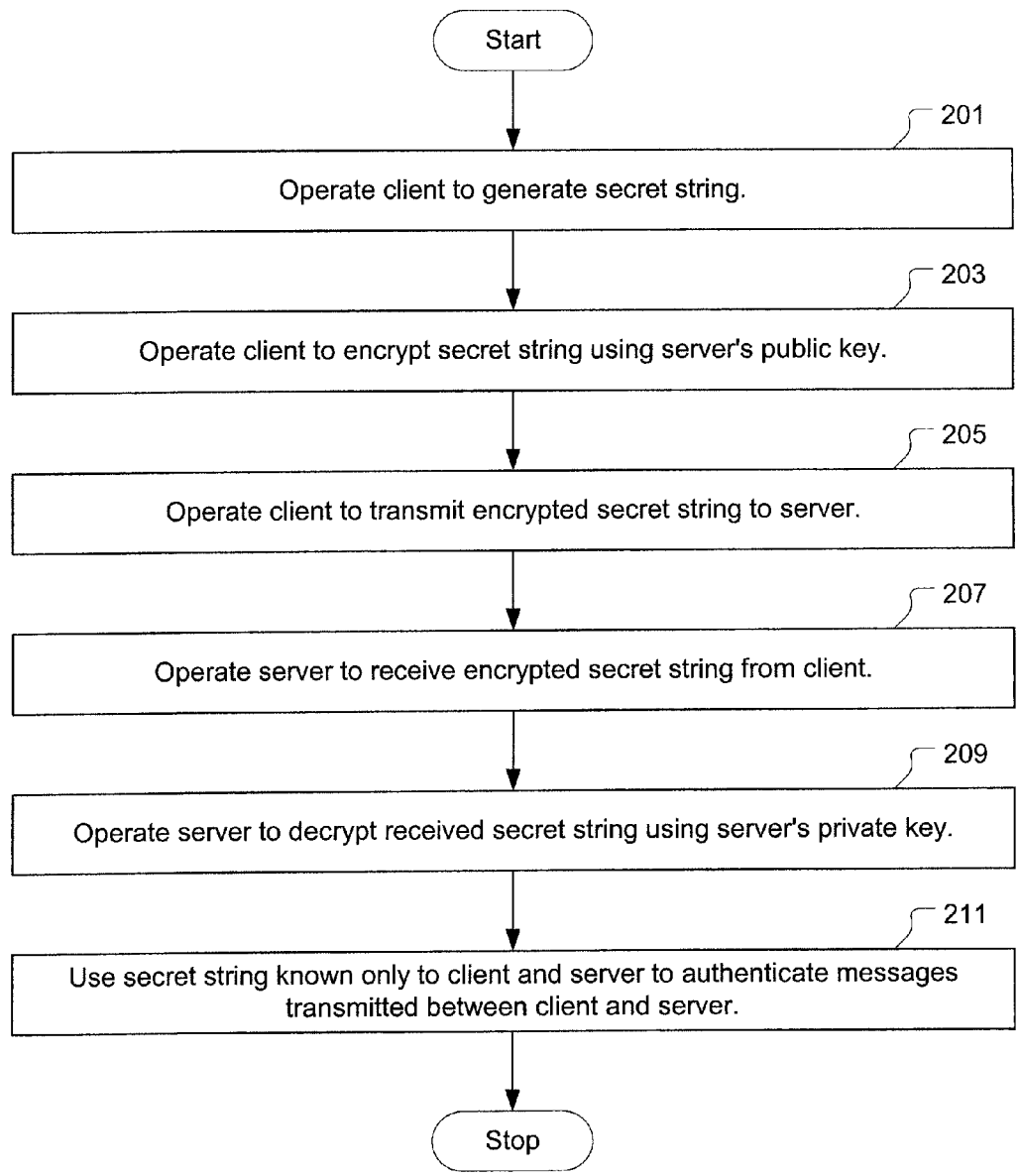
FIG. 2 is an illustration showing a flowchart of a method for securing communication between client and server computing systems, in accordance with one embodiment of the present invention.

FIG. 1 is an illustration showing a communication architecture, in accordance with one embodiment of the present invention. The communication architecture includes a client 101 defined to communicate with a server 103 through a network 105. Each of the client 101 and the server 103 represents a computing system that includes at least a processor and a memory. The client 101 is defined to perform client-side operations necessary to enable communication over the network 105 with the server 103. Similarly, the server 103 is defined to perform server-side operations necessary to enable communication with the client 101 over the network 105. In one embodiment, the client 101 and server 103 are defined to establish a transmission control protocol (TCP) connection with each other through the network 105. It should be understood that the network 105 can use any protocol stack. For example, in one embodiment, the network 105 can use a TCP protocol stack. In another exemplary embodiment, the network 105 can use a user datagram protocol (UDP) protocol stack. Also, it should be understood that in various embodiments the network 105 can be defined as a wired network, a wireless network, or combination thereof FIG. 2 is an illustration showing a flowchart of a method for securing communication between client and server computing systems, in accordance with one embodiment of the present invention. In one embodiment, the communication architecture of FIG. 1 can be used to implement the method of FIG. 2. It should be understood, however, that method of FIG. 2 can be performed with essentially any type of client computing system and server computing system. In one exemplary embodiment, the server computing system is defined as an instant messaging (IM) server, and the client computing system is defined as a mobile device, such as a cell phone.

The method of FIG. 2 includes an operation 201 in which a client computing system ("client" hereafter) is operated to generate a secret string. The secret string is defined as a data string that cannot be easily anticipated by an unauthorized entity, i.e., an entity that is not privileged to know the secret string. In one embodiment, the secret string is defined as a random number. In another embodiment, the secret string is defined as a combination of a random number and an identifier of the client. In yet another embodiment, the secret string is defined as a combination of a random number, an identifier of the client, and a time value corresponding to the moment at which the secret string is generated by the client. It should be appreciated that the secret string can be defined in a number of additional ways not specifically identified herein, so long as the secret string cannot be easily anticipated by an unauthorized entity.

The method continues with an operation 203 in which the client is operated to encrypt the secret string using a public key of the server computing system ("server" hereafter). The public key of the server corresponds to a private key that is only known to the server. In one embodiment, the encryption of the secret string is performed in accordance with an RSA (Rivest Shamir Adleman) encryption algorithm. In the RSA algorithm, a public key can be known by any entity, and can be used by any entity to encrypt a message. Also, in the RSA algorithm, a message encrypted with the public key can only be decrypted using a private key. The private key is only known by an entity authorized to view the encrypted message. It should be understood, that in other embodiments, the secret string may be encrypted using a technique other than the RSA encryption algorithm, so long as the secret string can be encrypted by the client and decrypted only by the server intended to view the secret string.

From the operation 203, the method proceeds with an operation 205 for operating the client to transmit the encrypted secret string to the server, In an operation 207, the server is operated to receive the encrypted secret string from the client. It should be understood that in the methods disclosed herein, transmission of messages between the client and server can be performed using essentially any communication protocol stack. For example, in one embodiment, transmission of messages between the client and server can be performed using the TCP/IP (transmission control protocol/internet protocol) protocol suite. It should be further understood that each of the client and server is equipped to perform its respective communication responsibilities.

From the operation 207, the method proceeds with an operation 209 in which the server is operated to use the server's private key to decrypt the encrypted secret string received from the client. Once the server has decrypted the secret string in operation 209, both the client and server know the secret string, and no other entity knows the secret string. Following the operation 209, the method includes an operation 211 for using the secret string to authenticate messages transmitted between the client and server. For example, the secret string is used to authenticate a message received at the server as having been transmitted from the client and received at the server in an unaltered state. Also, the secret string can be used to authenticate a message received at the client as having been transmitted from the server and received at the client in an unaltered state. Use of the secret string to authenticate a message is further described with respect to the method of FIG. 3.

Figure 3:
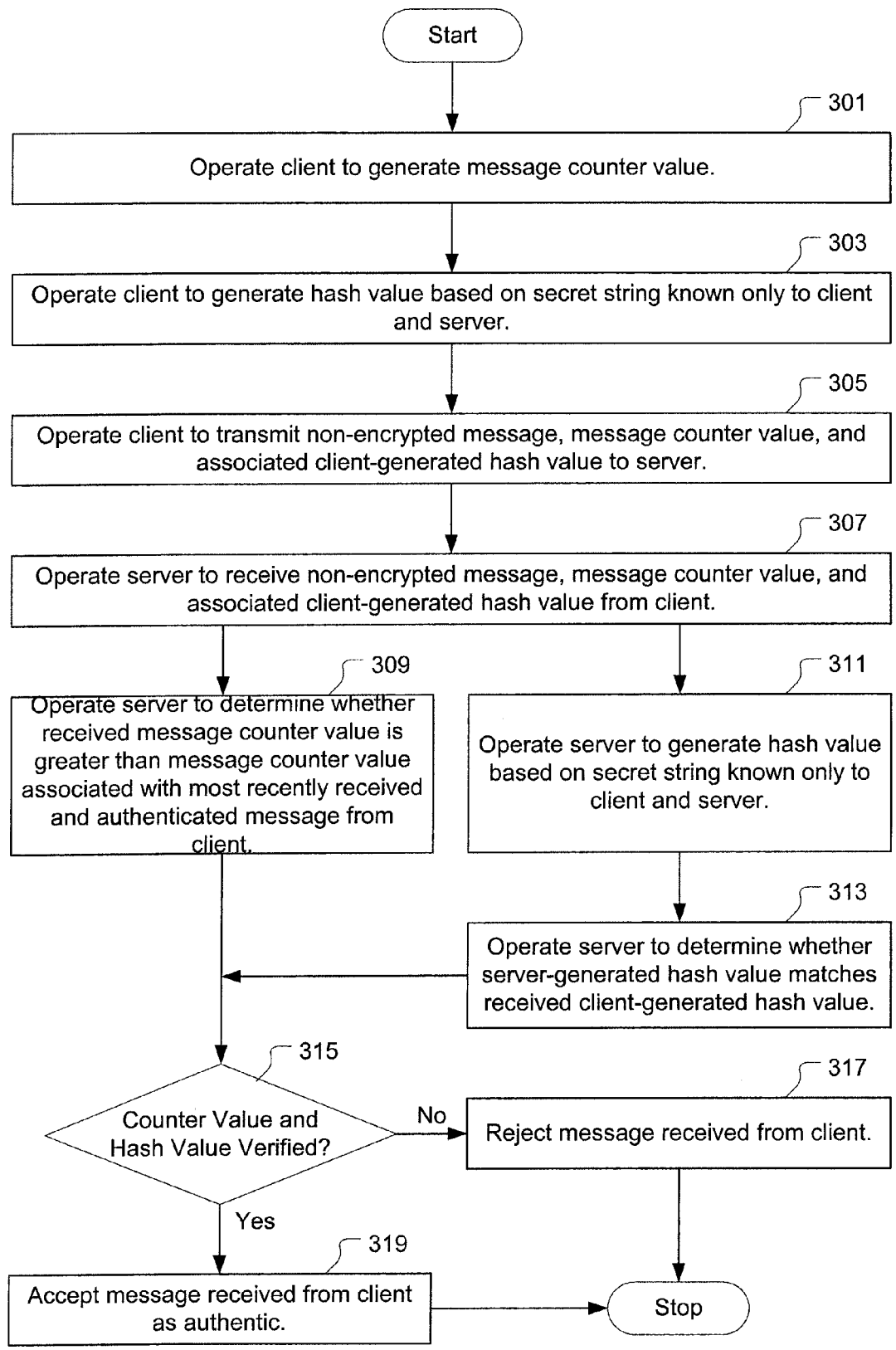
FIG. 3 is an illustration showing a flowchart of a method for conducting secure communication between a server computing system and a client computing system, in accordance with one embodiment of the present invention.

In one embodiment, operations 201 through 209 of the method of FIG. 2 are performed upon establishment of a communication session between the client and server. In one embodiment, the communication session is established by a secure login procedure conducted between the client and server. For example, a user at the client can remotely access a login prompt at the server, provide correct login credentials, and thereby establish the communication session between the client and server. Operations 201 through 209 can be performed to establish the secret string that is known only to the client and server as part of the secure login procedure, FIG. 3 is an illustration showing a flowchart of a method for conducting secure communication between a server and a client, in accordance with one embodiment of the present invention. The method includes an operation 301 for operating the client to generate a message counter value for a message to be transmitted to the server. The message counter value generated for a given message is greater than the message counter value generated for a previously transmitted message. In one embodiment, the message counter value corresponds to a running message count that is initialized upon establishment of the communication session between the client and server, and is incremented by the client upon generation of each message to be transmitted to the server.

The method also includes an operation 303 for operating the client to generate a first hash value based on 1) the secret string known only to the client and server (as established in the method of FIG. 2), 2) the content of the message to be transmitted, and 3) the message counter value generated in operation 301. In one embodiment, the first hash value is generated using a secure hash algorithm (SHA) hash function. However, it should be understood that other hash algorithms can be used in other embodiments. In one embodiment, the first hash value is generated based on a combination of the secret string, the content of the message to be transmitted, and the message counter value for the message to be transmitted. In another embodiment, the first hash value is generated based on a combination of the secret string, the content of the message to be transmitted, the message counter value for the message to be transmitted, and a session identifier such as a globally unique identifier (GUID). It should be understood that the content of the message as used to the generate the first hash value includes an entire content of the message, including header data, format data, content data, attachment data, etc.

Following the operation 303, the method proceeds with an operation 305 in which the client is operated to transmit to the server a non-encrypted version of the message, the message counter value, and the client-generated first hash value. An operation 307 follows in which the server is operated to receive from the client the non-encrypted version of the message, the message counter value, and the client-generated first hash value. As previously mentioned, it should be understood that transmission of messages between the client and server can be performed using essentially any communication protocol stack.

Following the operation 307, the method includes an operation 309 in which the server is operated to determine whether the message counter value received from the client is greater than a previously received message counter value, i.e., a message counter value associated with the most recently received and authenticated message from the client. In one embodiment, the server is defined to store the message counter value associated with each authenticated message that is received from the client. Upon authentication of a newly received message, the server can overwrite the previously stored message counter value with the message counter value associated with the newly received and authenticated message.

Also, following operation 307, the method includes an operation 311 in which the server is operated to generate a second hash value based on the content of the received message, the received message counter value, and the secret string. The second hash value is generated by the server using the same hash algorithm that was used by the client to generate the first hash value. Also, the server-generated second hash value is based on the same data as the client-generated first hash value. For example, in the embodiment where the client-generated first hash value is based on a combination of the secret string, the content of the message to be transmitted, and the message counter value, the server-generated second hash value is based on a combination of the secret string, the content of the message as received from the client, and the message counter value as received from the client. In another example, if the client-generated first hash value is based on a combination of the secret string, the content of the message to be transmitted, the message counter value, and the session identifier, then the server-generated second hash value is based on a combination of the secret string, the content of the message as received from the client, the message counter value as received from the client, and the session identifier. It should be understood that the content of the message as used by the server to generate the second hash value is the same message content used by the client to generate the first hash value.

Following the operation 311, the method includes an operation 313 in which the server is operated to determine whether the server-generated second hash value matches the client-generated first hash value as received from the client. The method proceeds from each of operations 309 and 313 with a decision operation 315 to determine whether the following two conditions are satisfied: 1) the result of operation 309 indicates that the message counter value received from the client is greater than a previously received message counter value, and 2) the result of operation 313 indicates that the server-generated second hash value matches the client-generated first hash value. If both of the above-identified conditions are satisfied, the method proceeds with an operation 319 in which the non-encrypted version of the message received at the server is accepted as authentic. If either of the above-identified conditions are not satisfied, the method proceeds with an operation 317 in which the non-encrypted version of the message received at the server is rejected as not being authentic.

In the particular embodiment of FIG. 3, checking of the message counter value in operation 309 is performed simultaneously with generation and checking of the second hash value in operations 311 and 313. However, it should be understood that in another embodiment, checking of the message counter value in operation 309 and generation and checking of the second hash value in operations 311 and 313, can be performed in a serial manner.

For example, in one embodiment, the method can proceed from operation 307 to operation 309. If the result of operation 309 indicates that the message counter value has not increased from the previously received message counter value, the method can proceed directly to operation 317 in which the non-encrypted version of the message received at the server is rejected as not being authentic. If the result of operation 309 indicates that the message counter value has increased, the method can proceed with operation 311 followed by operation 313. If the result of operation 313 indicates that the server-generated second hash value matches the client-generated first hash value, the method can proceed to operation 319 in which the non-encrypted version of the message received at the server is accepted as authentic. However, if the result of operation 313 indicates that the server-generated second hash value does not match the client-generated first hash value, the method can proceed to operation 317 in which the non-encrypted version of the message received at the server is rejected as not being authentic.

In another embodiment, the method can proceed from operation 307 to operation 311 followed by operation 313. If the result of operation 313 indicates that the server-generated second hash value does not match the client-generated first hash value, the method can proceed to operation 317 in which the non-encrypted version of the message received at the server is rejected as not being authentic. However, if the result of operation 313 indicates that the server-generated second hash value matches the client-generated first hash value, the method can proceed to operation 309. If the result of operation 309 indicates that the message counter value has not increased from the previously received message counter value, the method can proceed to operation 317 in which the non-encrypted version of the message received at the server is rejected as not being authentic. However, if the result of operation 309 indicates that the message counter value has increased, the method can proceed with operation 319 in which the non-encrypted version of the message received at the server is accepted as authentic.

In the embodiment of FIG. 3, the client is described as generating the message counter value and the first hash value, i.e., original hash value, and the server is described as verifying the message counter value and generating the second hash value to verify the original hash value. In another embodiment, the roles of the client and the server in method of FIG. 3 can be reversed. For example, once the secret string is established between the client and the server (see FIG. 2), the server can generate the message counter value and the first hash value, i.e., original hash value, and the client can verify the message counter value and generate the second hash value to verify the original hash value. It should be appreciated that this embodiment is essentially symmetric with regard to the embodiment of FIG. 3.

It should be appreciated that generation, transmittal, and verification of the message counter value as described above prevents a hacker from replaying a message in a session, because the server will reject a message that uses an old message counter value, i.e., a message counter value that has not increased from the previous one. Also, it should be appreciated that there is only a one-time cost associated with decryption of the secret string at the server upon establishment of the communication session. All later messages between the client and server incur low cost hash computations, but avoid the relatively high cost decryption process. Considering that the number of transmitted message in a communication session is typically large, the cost per message associated with the one-time secret string decryption at the server is quite low when amortized over the number of messages transmitted in the communication session. It should be appreciated that the communication methods disclosed herein provide increased server throughput and reduce hardware and operation costs.

Additionally, in one embodiment, the server is defined to manage communication sessions across multiple non-persistent connections. At the time of communication session establishment, the server sends a session identifier to the client. The session identifier enables the client to associated messages transmitted to the server with the particular session, thereby enabling continued use of the secret string established for the given session. For example, a TCP connection used to transmit a message between the client and server in a given session can be closed after transmission of the message without losing the session identity and correspondingly established secret string. Then, using the session identifier, another TCP connection can be established for the same session to enable transmission of another message between the client and server. Therefore, unlike in the non-keep-alive HTTPS protocol, there is no expensive SSL (secure sockets layer) private key decryption computation involved when establishing a new TCP connection to transmit a new message in an already established session.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for securing communication between client and server computing systems, comprising:
   receiving at a server computing system an encrypted version of a secret string, the secret string having been generated at a client computing system, and the secret string having been encrypted at the client computing system using a public key associated with a private key of the server computing system;
   decrypting the encrypted secret string at the server computing system using the private key of the server computing system, such that only the client and server computing systems know the secret string;
   receiving at the server computing system a non-encrypted version of a message from the client computing system, a message counter value, and a first hash value generated using a first hash algorithm, the first hash value based on a content of the message, the message counter value, and the secret string, wherein the message counter value is incremented for each message received from the client computing system;
   generating a second hash value at the server computing system using the first hash algorithm, wherein the second hash value is generated using the content of the received message, the received message counter value, and the secret string; and
   accepting the non-encrypted version of the message received from the client computing system as authentic upon determining at the server computing system that the second hash value matches the first hash value.

2. A method for securing communication between client and server computing systems as recited in claim 1, wherein the secret string is a combination of a random number, an identifier of the client computing system, and a time value.

3. A method for securing communication between client and server computing systems as recited in claim 1, wherein the secret string is encrypted at the client computing system using an RSA encryption algorithm.

4. A method for securing communication between client and server computing systems as recited in claim 1, further comprising:
   requiring the received message counter value to be greater than a previously received message counter value to enable accepting the non-encrypted version of the message received from the client computing system as authentic.

5. A method for securing communication between client and server computing systems as recited in claim 4, further comprising:
   rejecting the received message upon determining that either the second hash value does not match the first hash value, or the received message counter value is not greater than the previously received message counter value.

6. A method for securing communication between client and server computing systems as recited in claim 1, wherein the message counter value is generated by the client computing system upon generation of the message.

7. A method for operating a server computing system to conduct secure communication with a client computing system, comprising:
   establishing a secret string that is known only to the server and client computing systems;
   receiving from the client computing system at the server computing system a non-encrypted version of a message, a message counter value, and a first hash value generated using a first hash algorithm, the first hash value based on a content of the message, the message counter value, and the secret string;
   generating a second hash value at the server computing system using the first hash algorithm, the second hash value based on the content of the received message, the received message counter value, and the secret string; and
   accepting the non-encrypted version of the message received at the server computing system as authentic upon determining at the server computing system that the received message counter value is greater than a previously received message counter value and that the second hash value matches the first hash value.

8. A method for operating a server computing system to conduct secure communication with a client computing system as recited in claim 7, wherein the message counter value is generated by the client computing system upon generation of the message.

9. A method for operating a server computing system to conduct secure communication with a client computing system as recited in claim 7, wherein each of the first and second hash values is further based on a session identifier.

10. A method for operating a server computing system to conduct secure communication with a client computing system as recited in claim 7, wherein the first hash algorithm is a secure hash algorithm (SHA) hash function.

11. A method for operating a server computing system to conduct secure communication with a client computing system as recited in claim 7, wherein establishing the secret string that is known only to the server and client computing systems includes,
   receiving at the server computing system an encrypted version of the secret string, the secret string having been generated at the client computing system, and the secret string having been encrypted at the client computing system using a public key associated with a private key of the server computing system, and
   decrypting the encrypted secret string at the server computing system using the private key of the server computing system.

12. A method for operating a server computing system to conduct secure communication with a client computing system as recited in claim 7, wherein the secret string is a combination of a random number, an identifier of the client computing system, and a time value.

13. A method for operating a server computing system to conduct secure communication with a client computing system as recited in claim 7, further comprising:
   rejecting the received non-encrypted version of the message upon determining that either the second hash value does not match the first hash value, or the received message counter value is not greater than the previously received message counter value.

14. A computer readable medium including program instructions for operating a server computing system to conduct secure communication with a client computing system, the computer readable medium being any data storage device that can store data which can be thereafter read by a computer system, comprising:
   program instructions for operating the server computing system to receive an encrypted version of a secret string from the client computing system, wherein the secret string is generated at the client computing system and encrypted at the client computing system using a public key associated with a private key of the server computing system;
   program instructions for operating the server computing system to decrypt the encrypted secret string using the private key of the server computing system, such that only the client and server computing systems know the secret string;
   program instructions for operating the server computing system to receive a non-encrypted version of a message, a message counter value, and a first hash value generated using a first hash algorithm, the first hash value based on a content of the message, the message counter value, and the secret string;
   program instructions for operating the server computing system to generate a second hash value using the first hash algorithm, the second hash value based on the content of the received message, the received message counter value, and the secret string; and
   program instructions for operating the server computing system to recognize the received non-encrypted version of the message as authentic when the received message counter value is greater than a previously received message counter value and the second hash value matches the first hash value.

15. computer readable medium including program instructions for operating a server computing system to conduct secure communication with a client computing system as recited in claim 14, wherein the secret string is a combination of a random number, an identifier of the client computing system, and a time value.

16. A computer readable medium including program instructions for operating a server computing system to conduct secure communication with a client computing system as recited in claim 14, wherein each of the first and second hash values is further based on a session identifier.

17. A computer readable medium including program instructions for operating a server computing system to conduct secure communication with a client computing system as recited in claim 14, wherein the first hash algorithm is a secure hash algorithm (SHA) hash function.

18. A computer readable medium including program instructions for operating a server computing system to conduct secure communication with a client computing system as recited in claim 14, further comprising:
   program instructions for operating the server computing system to reject the received non-encrypted version of the message when either the received message counter value is not greater than the previously received message counter value, or the second hash value does not match the first hash value.

* * * * *